United States Patent [19]

Barber

[11] Patent Number: 4,649,035

[45] Date of Patent: Mar. 10, 1987

[54] PRODUCTION OF PHOSPHORUS AND PHOSPHORIC ACID

[75] Inventor: James C. Barber, Florence, Ala.

[73] Assignee: James C. Barber and Associates, Inc., Florence, Ala.

[21] Appl. No.: 763,211

[22] Filed: Aug. 7, 1985

Related U.S. Application Data

[60] Division of Ser. No. 728,620, Apr. 29, 1985, Pat. No. 4,608,241, which is a continuation-in-part of Ser. No. 503,099, Jun. 10, 1983, Pat. No. 4,619,819, which is a division of Ser. No. 428,840, Sep. 30, 1982, Pat. No. 4,451,277, which is a continuation-in-part of Ser. No. 301,378, Sep. 11, 1981, Pat. No. 4,383,847, which is a division of Ser. No. 223,122, Jan. 7, 1981, Pat. No. 4,372,929.

[51] Int. Cl.⁴ .............................................. C01B 25/01
[52] U.S. Cl. ....................................... 423/317; 71/33; 423/167; 423/299; 423/304
[58] Field of Search ........................ 423/167, 304, 317

[56] References Cited

U.S. PATENT DOCUMENTS

| | | | |
|---|---|---|---|
| 2,040,081 | 5/1936 | Curtis | 23/313 |
| 2,925,326 | 2/1960 | Pieper et al. | 423/317 |
| 3,050,374 | 8/1962 | Burt et al. | 423/304 |
| 3,057,700 | 10/1962 | Gross | 423/317 |
| 3,076,248 | 2/1963 | Darrow et al. | 423/167 |
| 3,341,289 | 9/1967 | Hendrickson | 423/167 |
| 3,531,250 | 9/1970 | Hinz et al. | 423/167 |
| 4,372,929 | 2/1983 | Barber | 423/323 |

Primary Examiner—John Doll
Assistant Examiner—Wayne A. Langel
Attorney, Agent, or Firm—James J. Brown

[57] ABSTRACT

Processes are disclosed for recovering solid wastes containing elemental phosphorus. The wastes may cause serious environmental problems at phosphorus furnaces because elemental phosphorus is toxic to marine animals. Recovery of the wastes was considered for the following.

1. At phosphorus furnace plants making phosphoric acid as one of the products, when the objective is to produce only high-quality phosphoric acid.
2. At phosphorus furnace plants making elemental phosphorus as a final product, and the objective is to produce only high-quality phosphorus.
3. At plant sites where neither phosphoric acid nor phosphorus is produced.

The processes include recycling the wastes to phosphorus furnaces. All of the phosphoric acid produced in 1 can be highly concentrated with low impurities content. In 2, all the low-quality phosphorus is recycled to the phosphorus furnaces and all the product is high grade. In 3, phosphorus furnaces are not available at the plant site and recycling the solid wastes is impractical. In this case processes are disclosed for recovering the elemental phosphorus from the waste, converting the residue to granular fertilizer, and making suspension fertilizer from water containing elemental phosphorus.

18 Claims, 5 Drawing Figures

PROCESS FOR MAKING PHOSPHORIC ACID

HIGH-VELOCITY BURNER

AIR HEATER

PROCESS FOR MAKING PHOSPHORIC ACID

PROCESS FOR MAKING PHOSPHORUS

PRODUCTION OF PHOSPHORUS AND PHOSPHORIC ACID

This application is a division of application Ser. No. 728,620 filed Apr. 29, 1985, entitled "Production of Phosphorus and Phosphoric Acid," now U.S. Pat. No. 4,608,241 which is a continuation-in-part of patent application Ser. No. 503,099, filed June 10, 1983, entitled "Production of Fluid Fertilizer from Phosphorus Furnace Waste Stream," now U.S. Pat. No. 4,619,819 which is a division of application Ser. No. 428,840, filed Sept. 30, 1982, entitled "Production of Fluid Fertilizer from Phosphorus Furnace Waste Stream," now U.S. Pat. No. 4,451,277 which is a continuation-in-part of application Ser. No. 301,378, filed Sept. 11, 1981, entitled "Production of Fluid Fertilizer from Phosphorus Furnace Waste Stream," now U.S. Pat. No. 4,383,870, which is a division of application Ser. No. 223,122, filed Jan. 7, 1981, entitled "Energy Conservation and Pollution Abatement at Phosphorus Furnaces," now U.S. Pat. No. 4,372,929.

BACKGROUND OF THE INVENTION

Elemental phosphorus is produced by smelting a mixture of phosphate ore, reducing carbon, and silica in a submergedarc electric furnace. The ore reacts with the reducing carbon at high temperature and in this reaction the combined phosphorus is reduced to the element. Some of the metal oxides present in the furnace feed materials are reduced to metallic elements. Iron oxide is a constituent in the furnace feed materials and this oxide is reduced to elemental iron which combines with elemental phosphorus to form a mixture of iron phosphides called ferrophosphorus. Other metals alloy with the ferrophosphorus. The ferrophosphorus is tapped from the furnace as a molten material.

Phosphorus furnace feed materials contain metal oxides which are not reduced by carbon to form the metal elements. The metal oxides combine to form a slag which is tapped from the furnace as a molten material. Both slag and ferrophosphorus are byproducts.

Hydrogen compounds react with reducing carbon in the furnace to form hydrogen gas. The hydrogen compounds are hydrocarbons which may be constituents of the reducing carbon. Furnace feed materials may contain moisture or combined water and this compound is reduced to form hydrogen gas. The hydrogen mixes with other gases volatilized from the furnace.

Carbon in the reducing carbon oxidizes to form carbon monoxide when the various compounds in the furnace are reduced. The carbon monoxide mixes with the other gases volatilized from the furnace. Most of the carbon monoxide is derived from the reduction of combined phosphorus in phosphate ore and only a small proportion is formed by the reduction of metal oxides and hydrogen compounds. Most of the elemental phosphorus formed by the reduction of phosphate ore is discharged from the furnace as a gas. Therefore, gases from the furnace are composed mainly of carbon monoxide and phosphorus. But the furnace gas contains other materials. Sources of other materials in the furnace gas mixture are given below.

1. Reducing carbons fed to the phosphorus furnace contain volatile constituents, and some of these constituents are volatilized without being reduced. Both saturated and unsaturated hydrocarbons are volatilized. Some reducing carbons, such as coals, contain combined water which may be reduced in the furnace to form hydrogen.
2. Phosphate ore contains fluorine, and part of the fluorine is volatilized when the ore is heated in the phosphorus furnace. The fluorine probably is discharged from the furnace as silicon tetrafluoride ($SiF_4$).
3. Air enters the furnace through feed chutes when materials are fed into the furnace. Also, air enters the furnace through openings in the furnace roof. Oxygen in the air oxidizes the elemental phosphorus to $P_2O_5$ and the $P_2O_5$ mixes with the furnace gas stream. Nitrogen also mixes with the furnace gas.
4. Small particles of furnace feed materials become suspended in the gas.
5. Metals and metal compounds are volatilized by the electric arc in the furnace. These materials condense as small particles which become suspended in the furnace gas stream.

Furnace gases are treated to condense the elemental phosphorus from the gas mixture, thereby separating the phosphorus from the other gases. FIG. 1 in patent application Ser. No. 503,099 illustrates the process for treating phosphorus furnace gas stream. The gases are treated in an electrostatic precipitator to remove particulates. A small amount of elemental phosphorus is collected with the particulates. The gases are then contacted with water to condense phosphorus by adiabatic cooling. The gases are further cooled by water in a tubular cooler to condense additional phosphorus. Then the gases are exhausted by a compressor.

The composition of the condenser exhaust gas depends largely on the type and composition of the reducing carbon used in the furnace. Metallurgical coke is frequently used as a reducing carbon. The analyses shown in Table 1 were obtained when metallurgical coke was being used.

TABLE 1

| Composition of Condenser Exhaust Gas[a] | |
|---|---|
| Constituent | Percent by volume on a dry basis |
| $CO_2$ | 0.7 |
| $O_2$ | 0.1 |
| CO | 87.3 |
| $H_2$ | 7.9 |
| $N_2$ | 2.3 |
| Unsaturated hydrocarbons[b] | 0.6 |
| $CH_4$ | 1.1 |

[a] Metallurgical coke was the reducing carbon.
[b] Assumed to be ethylene.

The gross heating value of the gas was calculated to be 343 Btu per cubic foot at STP. About 80,500 cubic feet (STP) of gas was obtained per ton of phosphorus produced. The potential energy in the gas was about 27.6 million Btu per ton of phosphorus produced. Energy in the metallurgical coke was about 38.2 million Btu per ton of phosphorus, and the condenser exhaust gas has about 72 percent as much energy as the reducing carbon.

The furnace gas contains about 24.9 pounds of elemental phosphorus per 1,000 cubic feet of noncondensable gas at STP, and this is equivalent to about 6 percent phosphorus by volume. Dust is collected in the precipitator at a rate of about 0.07 ton per ton of elemental phosphorus produced. The gas mixture is essentially dry, but it is cooled from about 600° F. to about 145° F. by saturating with water vapor in a spray chamber. Phosphorus content of the gas is reduced to about 0.3 pound per 1,000 cubic feet of noncondensable gas at STP by cooling in the spray chamber. About 98.8 percent of the phosphorus in the furnace gas is recovered by adiabatic cooling.

The gases are further cooled in a condenser wherein gases flow through the tubes and cooling water is outside. Water is sprayed into the tubes to irrigate the inside surfaces and prevent fouling. The gases are cooled to about 128° F. in the tubular cooler and the phosphorus content of the gases is reduced to about 0.2 pound per 1,000 cubic feet of noncondensable gas at STP, resulting in an overall phosphorus recovery of about 99.2 percent. Water is condensed in the tubular cooler at a rate of 484 pounds per ton of phosphorus produced. After condensation of the phosphorus the gases are exhausted by a Nash Hytor pump.

Both the adiabatic condenser and the tubular cooler drain to a sump as shown in FIG. 1, application Ser. No. 503,099. Condensate from the condensers is a mixture of water, liquid phosphorus, and an impure phosphorus product called phosphorus sludge. The sump is designed to separate the three materials as shown in FIG. 91 in Chemical Engineering Report No. 3. Twoopartitions are in the sump, thereby dividing it into three compartments. Liquid phosphorus has a specific gravity of 1.73 at 140° F. and it separates from other materials by collecting in the compartment under the condenser drain. The liquid phosphorus is periodically pumped to storage tanks by submerged pumps. Water and phosphorus sludge overflow a partition and flow into the middle compartment and phosphorus sludge collects in the bottom of this compartment because it has a specific gravity of about 1.23. The phosphorus sludge is periodically removed from the compartment by submerged pumps and is stored in tanks. Water overflows the second partition and enters the third compartment called the spray liquor compartment. From this compartment the water is recirculated to the Nash Hytor pump, the tubular cooler, and the adiabatic condenser by pumps.

The electrostatic precipitators at phosphorus furnaces are provided to collect solid particles that become entrained in the gas stream. From 60 to 90 percent of the entrained solids are collected. Uncollected solids are removed from the gas stream by contacting the gases with water sprays in the adiabatic condenser and the tubular cooler.

Phosphorus sludge becomes viscous after storage. Also, the material may be sticky depending on the type of reducing carbon used. Microscopic examination of the sludge shows that it consists of globular particles of yellow phosphorus as large as 1 to 2 millimeters in diameter and the particles may be only a few microns in diameter. Some of the smaller globules agglomerate into clusters. Electrical charges and physical barriers of foreign solids are thought to retard or prevent coalescence of the phosphorus particles.

Following is the approximate composition of the major solid constituents in the sludge.

$P_2O_5$: 32 percent
F: 23 percent
CaO: 8 percent
$SiO_2$: 7 percent

The proportion of total phosphorus produced as phosphorus sludge varies widely, but data given in Chemical Engineering Report No. 3, Tables X and XII, may be used to determine a typical proportion, as indicated below.

|  | Tons elemental phosphorus per day |
|---|---|
| 22.4 tons per day of phosphorus containing 97.8 percent phosphorus = | 21.91 |
| 5.5 tons per day of phosphorus sludge containing 68.9 percent phosphorus = | 3.79 |
| Total | 25.70 |

The data above indicate 14.7 percent of the phosphorus is collected as phosphorus sludge when separation is made in the condenser sump. The phosphorus content was 68.9 percent and this was rich enough to burn in a phosphoric acid production unit.

When phosphorus sludge is stored, heated, or agitated, some of the particles of yellow phosphorus coalesce. When the material is stored in a tank, liquid phosphorus will collect in the bottom of the tank. The phosphorus can be pumped out and the yield of good phosphorus is thereby increased. When this occurs the percentages of solids and water increase. Upon prolonged storage with occasional melting and agitation, the phosphorus content of the sludge may be reduced to the range of 5 to 15 percent. The material becomes very viscous and the stickiness increases. Material with depleted phosphorus content is called consolidated sludge, and it possesses characteristics which prevent it from being pumped.

In addition to storing, heating, and agitating, the recovery of good phosphorus can be increased by filtering or centrifuging the phosphorus sludge. In both cases residues are obtained and the residues contain too much phosphorus to be discarded. When liquid or solid materials contain elemental phosphorus, serious pollution problems arise when the materials are stored or discharged as wastes. Furthermore, filtering or centrifuging phosphorus sludge is both hazardous and costly.

The phosphorus in phosphorus sludge can be evaporated by heating the material in a still. A carrier gas can be provided to sweep out the phosphorus in the still and the phosphorus can be separated from the carrier gas by condensing. The gas mixture can be cooled by contacting it with water by an arrangement similar to that shown in FIG. 1, application Ser. No. 503,099. A still is shown as FIG. 4 in the present application. Prolonged heating of sludge in the still will evaporate essentially all the phosphorus from the solids, but a large amount of fuel is required.

At the Tennessee Valley Authority National Fertilizer Development Center, phosphorus sludge was burned and $P_2O_5$ was formed. The $P_2O_5$ was reacted with water to produce phosphoric acid in accordance with a process described in Corrosion, Volume 14, 21-6, August 1958. Operation of the phosphoric acid unit with various compositions of phosphorus sludge disclosed that the minimum phosphorus content required for combustion was about 60 percent. Freshly made sludge normally contained enough phosphorus to burn, as discussed above, but consolidated sludge or residues obtained by filtering or centrifuging were too lean to burn. Dust is discharged from precipitators as a slurry and the slurry contains elemental phosphorus. However, the phosphorus content of the precipitator dust is too low for the material to be burned to produce phosphoric acid. When the sludge contained less than about 60 percent phosphorus the material had to be enriched with phosphorus to increase its calorific value. Treatment of sludge to increase the recovery of good phosphorus was of little benefit.

The phosphoric acid produced by burning phosphorus sludge is black and it contains solid impurities. Only orthophosphoric acid could be produced because of the relatively low calorific value of the sludge. The phosphoric acid was used for the production of fertilizers, and non-orthophosphoric acid was preferred. Phosphorus in sludge was not completely oxidized to $P_2O_5$. Some of the phosphorus was oxidized to $P_2O_3$ and a mixture of phosphoric and phosphorous acids was formed. The value of phosphoric acid made from sludge was less than that made from good phosphorus. Consequently, the alternative of burning phosphorus sludge to produce impure phosphoric acid is not attractive.

At times during World War II, all the phosphorus produced at the TVA National Fertilizer Development Center was used in munitions. None of the phosphorus was converted into phosphoric acid. During these periods the phosphorus and phosphorus sludge were agitated and elutriated with hot water in equipment called a washer. High-quality phosphorus was produced as required for munitions. Solid impurities and phosphorus droplets overflowed the washer. This watery mixture was discharged into a 14-acre settling pond to clarify the water before it was discharged into a watercourse.

Clarified water contained dissolved elemental phosphorus and colloidal phosphorus particles in suspension. The clarified water was toxic to marine animals, and fish were unable to survive in the receiving stream. Breakouts occurred at the settling pond, resulting in the release of additional hazardous waste to the watercourse. Phosphorus production was discontinued at the TVA National Fertilizer Development Center in 1976. Nevertheless, the settling pond continues to be a potential pollution hazard. Additional breakouts of phosphorus-containing solids may occur and water in the settling pond may be inadvertently discharged to the receiving stream. Heretofore, technology has not been available to dispose of the hazardous wastes.

OBJECTS OF THE INVENTION

Wastes generated at phosphorus furnaces are safety hazards and they may cause serious air and water pollution problems. Most of the wastes contain elemental phosphorus which oxidizes spontaneously when the waste is exposed to air. A phosphorus oxide, $P_2O_5$, is emitted as small sized particulates which are readily airborne. The $P_2O_5$ emitted to the air in this manner causes air pollution. Marine animals are poisoned when watercourses contain small concentrations of elemental phosphorus. Some species are killed when the watercourse contains only 1 to 2 parts of elemental phosphorus per billion parts of water, and it is obvious that release of a small amount of phosphorus-containing waste can cause serious water pollution problems.

Elemental phosphorus and phosphorus-containing wastes are kept underwater to prevent exposure to air and oxidation of the phosphorus. Water exposed to phosphorus in this manner becomes a potential water pollutant. The solubility of phosphorus in water is about three parts of phosphorus per million parts of water, or about 3,000 times the toxic limit. Furthermore, colloidal phosphorus particles are suspended in water which has come in contact with phosphorus. The colloidal particles are not removed by clarification. Solid waste disposal processes should include treatment of water which has come in contact with phosphorus or phosphorus-containing materials.

Chemical processes are available for treating water to remove elemental phosphorus. In most cases the element is oxidized, but air pollution may be a problem if the resulting $P_2O_5$ is released to the atmosphere. Chemical treatment of the water usually is economical because large quantities of the water must be treated. Further investigation of the disposal of water waste containing elemental phosphorus led to two inventions for recovery of the water by adding it to suspension fertilizers, as disclosed in U.S. Pat. Nos. 4,383,847 and 4,451,277. When wastewater from phosphorus condensers is recovered, a saving of about $2.00 per ton of phosphorus is obtained because the wastewater contains nutrients.

When hazardous wastes are converted into useable products, some benefits accrue which lessen the overall problem. In the case of phosphorus-containing wastes an obvious product is elemental phosphorus. In the present invention consideration was given to the preparation of products which can be recycled to the furnace as feed materials. The material is smelted and combined phosphorus is recovered as elemental phosphorus. Some of the benefits from treatment of the phosphorus-containing waste in this manner are listed below.

1. Complete removal of elemental phosphorus from the waste will not be necessary.
2. Constituents in the solid wastes have value as furnace feed.
3. Toxic metals in the wastes become encapsulated in the glassy slag, or these metals alloy with ferrophosphorus. In both cases the toxic metals are rendered innocuous and they are ultimately disposed of as byproducts.
4. Phosphorus-containing wastes can be converted into useable products at the rate they are generated. Accumulation of the toxic wastes at the plant site can be eliminated.

An object of the present invention is to recover the wastes by converting them into useable products, and a further objective is to provide recovery processes which comply with all environmental requirements. A further object is to recover the wastes at minimum net cost of production.

The recovery processes are expected to be applied at the following sites.

1. Phosphorus furnace plants producing high-quality phosphoric acid.
2. Phosphorus furnace plants producing high-quality elemental phosphorus.
3. Plant sites where neither phosphoric acid nor elemental phosphorus is produced.

DISCLOSURES IN THE INVENTION

About 80 percent of the elemental phosphorus produced in the U.S. is converted into phosphoric acid. In the process, elemental phosphorus is burned to oxidize it to $P_2O_5$. The oxide is then reacted with water to produce phosphoric acid. Under some conditions phosphorus-containing wastes can be burned to oxidize the elemental phosphorus to $P_2O_5$ which can be reacted with water to produce phosphoric acid. However, phosphoric acid made from phosphorus-containing wastes is highly contaminated. Furthermore, the wastes are not readily burned because solids in the wastes interfere with combustion.

Phosphorus sludge usually contains enough phosphorus to sustain combustion, but the phosphoric acid made from it is contaminated with fluorine and suspended solids. The solids in phosphorus sludge interfere with combustion as they do in the phosphorus-containing wastes, and phosphorus is frequently incompletely oxidized. The acid produced may be a mixture of phosphoric and phosphorous acids. The value of phosphoric acid made from phosphorus sludge is adversely affected by contamination, and the value may be further decreased by the presence of phosphorous acid or other acids which contain incompletely oxidized phosphorus. The recovery of phosphorus sludge as phosphoric acid has not been practiced widely because of the economic penalty from the production of a low-value product.

Phosphoric acid can be used to agglomerate phosphate ore as disclosed in U.S. Pat. No. 4,372,929. Agglomeration is not adversely affected by the use of highly contaminated phosphoric acid. Furthermore, phosphorus in the acid may be incompletely oxidized, and the use of a mixture of phosphoric and phosphorous acids produced by burning phosphorus sludge is unimportant when the acid is to be used for agglomeration. In the agglomeration process the acid is mixed with phosphate ore and an alkaline substance. The mixture is then tumbled to form agglomerates and the agglomerates are dried to indurate the material. Phosphate ore is normally agglomerated by heating it to temperatures high enough to partially melt it. Also, the ore may be agglomerated and then indurated by heating the agglomerates to high temperature. In both cases the phosphate ore undergoes phase changes by heating to high temperatures. But the phosphate ore undergoes no change in phase when it is agglomerated according to the processes described in U.S. Pat. No. 4,372,929, and this is called low-temperature agglomeration. When the ore undergoes phase changes, the process is called high-temperature agglomeration. The energy consumed is much greater for the high-temperature process than for low-temperature agglomeration.

In U.S. Pat. No. 4,421,521 a process is described for the agglomeration of reducing carbon by the low-temperature process. Phosphoric acid sludge is mixed with the reducing carbon instead of phosphoric acid. The mixture is neutralized with an alkaline substance, the mixture is tumbled to form agglomerates, and the agglomerates are indurated by drying.

Phosphoric acid sludge used in the agglomeration process is a heterogeneous mixture which has settled from wet-process phosphoric acid. Much of the material is solids which have precipitated from merchant-grade wet-process phosphoric acid. A typical analysis of phosphoric acid is given in table 2.

TABLE 2

| Typical Analysis of Phosphoric Acid Sludge | |
|---|---|
| Constituent | Percent |
| $P_2O_5$ | 45.6 |
| $Fe_2O_3$ | 1.9 |
| $Al_2O_3$ | 1.5 |
| MgO | 0.8 |
| F | 2.3 |
| $SO_4$ | 7.8 |
| CaO | 3.0 |
| $H_2O$ | 18.2 |
| Solids | 18–19 |
| Total | 99.1–100.1 |

From the data in table 2 it is obvious that the phosphoric acid sludge is highly contaminated. Nevertheless, the material could be used satisfactorily to agglomerate reducing carbon particles.

Elemental phosphorus is soluble in benzene, and phosphorus sludge is extracted with benzene as a part of the analysis to determine the elemental phosphorus content of the material. Some organic chemicals may be present which may dissolve in benzene. The benzene extract is normally analyzed for phosphorus to complete the determination. The material insoluble in benzene is called "B.I."; the B.I. in phosphorus sludge contains $P_2O_5$, F, CaO, $SiO_2$, and carbon as major phases. High-quality phosphorus contains only about 0.5 percent B.I. The phosphorus sludge collected in condenser sumps typically contains 7 to 22 percent B.I., and its phosphorus content is typically in the range of 70 to 90 percent. But some of the phosphorus separates out during storage and the B.I. content of the material increases. Phosphorus sludge stored for a prolonged period and occasionally agitated by pumping may contain only about 5 percent phosphorus on a dry basis and the remainder will be B.I. when the sludge contains no significant concentration of organic materials. Phosphorus sludge with such low concentrations of elemental phosphorus is uneconomical to process to recover the phosphorus values, and the material may be considered a waste.

From 15 to 20 percent of the phosphorus produced is recovered as phosphorus sludge in the condenser sump. However, the proportion recovered as phosphorus sludge depends on the performance of the electrostatic precipitator. Precipitators are not provided at some furnaces, and the quantity of sludge collected will be greater than it is at furnaces equipped with precipitators.

Phosphorus sludge normally has a colorific value high enough to burn. When phosphoric acid is made from the material the ratio of solids to $P_2O_5$ will be in the range of 0.02 to 0.09, but the ratio of solids to $P_2O_5$ in the phosphoric acid sludge is considerably higher; consequently, it was assumed that the phosphoric acid made from phosphorus sludge is satisfactory for use in low-temperature agglomeration of phosphate ore. A process is therefore provided for recycling phosphorus sludge, and said process consists of the following steps.

1. Burning phosphorus sludge to make a mixture of phosphorus oxides.
2. Reacting the mixture of phosphorus oxides with water to make an acidic mixture.
3. Recycling acidic mixture prepared in 2 to low-temperature agglomerating processes wherein phosphate ore is prepared for smelting.
4. Feeding agglomerated phosphate ore prepared in 3 to a submerged-arc electric furnace.
5. Smelting agglomerated phosphate ore to produce phosphorus and phosphorus sludge.

Small sized reducing carbon can be agglomerated by the low-temperture process. When the agglomerated reducing carbon is fed to the furnace the carbon reduces phosphate ore and combined phosphorus in the agglomerates to produce elemental phosphorus.

At the TVA National Fertilizer Development Center, phosphorus sludge was burned and the phosphorus oxides were hydrated to make phosphoric acid. The facility is shown in FIG. 3 in the publication, "Corrosion Problems in the Manufacture of Phosphoric Acid from Elemental Phosphorus," *Corrosion* 14, 21–6 (August 1958). About 20 percent of the phosphorus in the sludge was burned in the vaporizer. Unburned phosphorus was vaporized and it flowed to a combustion chamber, called a burner in the publication, and combustion was completed. Part of the B.I. in the phosphorus sludge remained in the vaporizer where it accumulated as a slag. Nevertheless, the quality of phosphoric acid made from phosphorus sludge was much lower than that made from high-quality phosphorus. The acid contained carbon and it was black, the fluorine content was greater than acid made from high-quality phosphorus, and a small percentage of the phosphorus in the acid was incompletely oxidized. The phosphoric acid was used to make some fertilizer mixtures, but it was not satisfactory for making chemicals such as feed-grade phosphates. But the process for recycling phosphorus sludge described above does provide for all the phosphorus to be converted into high-quality phosphoric acid. Phosphorus sludge is not stored, and loss of phosphorus in vitiated sludge will be eliminated.

One of the methods for treating phosphorus sludge to recover high-quality phosphorus is to centrifuge the material. A residue is obtained which is a solid waste, but separation of phosphorus from B.I. is not complete and some elemental phosphorus will remain in the residue. The elemental phosphorus can be removed by heating the residue in a still to evaporate the phosphorus. The waste may be disposed of in a landfill provided no toxic metals are present. However, toxic metals may be volatilized in the furnace and condensed as finely divided particles. The particles may be carried over into the condensing system where they will collect in the B.I. Landfill disposal is not satisfactory when centrifuge residue contains toxic metals.

Centrifuging of phosphorus sludge and evaporating the phosphorus in a still are costly treatment methods. The phosphorus-containing wastes frequently are stored in tanks, sumps, or ponds to avoid treatments which do not yield enough phosphorus to pay the treating cost. Fumes may be emitted from the storage facilities, and accidental discharges of the phosphorus-containing wastes to watercourses are continuous environmental hazards.

Phosphorus sludge may be filtered to separate high-quality phosphorus from the B.I. material. Unrecovered phosphorus remains in the filter cake, and the problems of treating and storing the filter cake waste are similar to those in centrifuging.

Costs and hazards associated with centrifuging and filtering phosphorus sludge are eliminated by converting the material into an acidic mixture and recycling the mixture to a low-temperature agglomerator. Phosphorus-containing wastes, such as residue from centrifuging and filter cake from filtering, are not generated and treatment of these wastes is eliminated.

In the present invention an improved process is disclosed for the conversion of phosphorus sludge into an acidic mixture. A burner is used which is specifically designed to burn phosphorus sludge. The burner is described in U.S. Pat. No. 3,050,374, and a burner arrangement is shown in FIG. 1. The sludge is broken up into small particles by the kinetic energy in the combustion air. Phosphorus sludge may be viscous and sticky, and the burner can be designed to handle such materials.

When phosphorus sludge contains less than about 60 percent phosphorus, its calorific value is too low to sustain combustion. A process is disclosed to heat the combustion air to provide additional energy and thereby improve combustion of the material. An air heater is shown in FIG. 2. The byproduct furnace gas can be cleaned and burned in the combustion chamber to heat the combustion air. Cleaning the gas will prevent air pollution when the combustion gases are discharged to the atmosphere.

The integrated steps in the process for producing high-quality phosphoric acid are shown in FIG. 3. Phosphorus sludge is burned to make an acidic mixture which is used to agglomerate phosphate ore. The agglomerates are smelted to reduce the combined phosphorus to elemental phosphorus. Only high-quality phosphoric acid is produced which has a $F:P_2O_5$ weight ratio in the range of 0.000120 to 0.000140. The metals:-$P_2O_5$ weight ratio in the high-quality acid is in the range of 0.00060 to 0.00080. Phosphoric acid containing up to 80 percent $P_2O_5$ can be produced. It is not possible to make 80 percent $P_2O_5$ acid by burning phosphorus sludge because the sludge contains water. Highly concentrated phosphoric acid contains tripolyphosphoric acid which is beneficial in the production of fertilizers. Also, production of highly concentrated phosphoric acid reduces freight cost when the material is shipped.

Phosphorus sludge collected in the condenser sump can be burned to make phosphoric acid for use in agglomerating furnace feed materials. From 15 to 20 percent of the phosphorus will be recycled when all of it is used for agglomeration. High-quality phosphorus can be mixed with the sludge to recycle even larger percentages when economics support the larger recycle rate.

Small sized reducing carbon generally costs less than the lump material, and phosphoric acid can be used in the agglomeration process for both phosphate ore and reducing carbon. Relatively larger percentages of phosphorus will be recycled when phosphoric acid is used to agglomerate both materials.

In the production of phosphorus, such savings are realized from the smelting of unbeneficiated phosphate ore, called raw ore. The raw ore contains clay and silica, both of which are separated from particles of fluorapatite mineral and are discarded during beneficiation, and the percent $P_2O_5$ is increased. Nevertherless, beneficiation is costly and about 30 percent of the fluorapatite mineral is lost when the ore is upgraded in this manner. Silica rock is then fed to the phosphorus furnace to replace silica removed by beneficiation, and it is evident cost savings would result from smelting the raw ore.

Phosphorus producers agglomerate raw phosphate and smelt the agglomerates without upgrading. The silica in the raw phosphate is utilized as flux. But satisfactory furnace operation depends on smelting high-grade ore. The percent $P_2O_5$ in the phosphate plus silica mixture is taken to be an index of the grade. When the percent $P_2O_5$ in the mixture is less than about 24, furnace operation is unsatisfactory and electrical energy consumption increases. The percent $P_2O_5$ in the phosphate plus silica mixture should be increased to the range of 26 to 28 to obtain satisfactory furnace operation, and the operation may be further improved by upgrading to $P_2O_5$ contents greater than 26–28 percent.

High-grade phosphate may be blended with raw ore for upgrading, but upgrading in this manner is costly. Economic gains from smelting unbeneficiated ore are largely offset by blending in high-grade phosphate ore. The acidic material shown as 22 in FIG. 3 can be used to upgrade the agglomerates made in agglomerator 21. Low-grade phosphate ore can be upgraded to the range of 26–28 percent $P_2O_5$ in the mixture of phosphate ore and silica. Significant economic benefits are thereby realized from the recycling of phosphorus as acidic material when the acidic material is derived from phosphorus sludge.

High-grade phosphate ore may be agglomerated in agglomerator 21 and upgrading with acidic material 22 may not be needed. In this case an agglomerating process will be selected which requires a relatively small amount of acidic material. It may be economical to recycle less than 15 to 20 percent of the phosphorus. Phosphorus producers have the option of treating sludge collected in the condenser sump to recover additional high-quality phosphorus. A vitiated phosphorus sludge will then be obtained. In one phosphorus sludge treating process the overall recovery of high-quality phosphorus can be increased to the range of 90 to 92 percent, and the treatment cost is small. The resulting sludge is vitiated but it can be burned and hydrated by the process disclosed herein. Only about 8 to 10 percent of the phosphorus would be converted into acidic mixture 22 and would be recycled to the agglomeration process.

A process for the production of elemental phosphorus is disclosed wherein sludge is treated to separate phosphorus from the B.I. material. The B.I. material is mixed with phosphate ore and agglomerated, and the resulting agglomerates are smelted. Steps in the process are given below.

1. Agglomerate phosphate ore by low-temperature process wherein B.I. material is incorporated in agglomerates.
2. Smelt agglomerates prepared in 1 in a submerged-arc electric furnace.
3. Incorporate condenser bleedoff water into a process for the production of orthophosphate suspension fertilizer.
4. Pump phosphorus and phosphorus sludge to a tank wherein phosphorus is separated from phosphorus sludge by a gravity-separation process.
5. Fluidize phosphorus sludge with an alkaline dispersing agent.
6. Evaporate phosphorus sludge in a still to recover high-quality phosphorus in a condensing assembly.
7. Recycle residue from still to agglomerator in step 1.
8. Add phosphorus recovered in still to high-quality phosphorus storage.

Phosphorus can be separated from phosphorus sludge by centrifuging, filtering, washing, or gravitational separation. The vitiated sludge is treated in a still to obtain a phosphorus-free residue which is the B.I. material in the phosphorus sludge. The phosphorus sludge is then treated with an alkaline dispersing agent to fluidize the material. The viscosity and stickiness of the material is decreased by fluidization.

A still is used to evaporate phosphorus and obtained phosphorus-free residue. FIG. 4 is a diagram to explain the distillation process. Phosphorus-containing waste is placed in drum 49; the drum is then rotated and heated by gases from combustion of a gaseous fuel. A purge gas is used to sweep out phosphorus vapor and water vapor and to transport these vapors into condenser 28. The gases are cooled to condense phosphorus and water, thereby separating the materials from the purge gas.

The purge gas can be released to the atmosphere at condenser sump 31 when the purge gas is nitrogen. The condensing system operates under sufficient pressure to overcome the hydrostatic head resulting from the immersion of the bottom of condenser 28 into the water. But the condensing system must be designed to prevent the purge gas from escaping into the atmosphere when a poisonous or combustible gas is used. Byproduct furnace gas is both poisonous and combustible, and this gas would provide an economical purge with a properly designed condensing arrangement. Part of the byproduct furnace gas generated in the process can be circulated through the still as a purge and then returned to the gas main, cleaned, and used as a fuel.

Natural gas or byproduct furnace gas can be used as the fuel in burner 55. Byproduct furnace gas costs less than natural gas, but the gas discharging from the phosphorus condensing system contains too much elemental phosphorus to be used without cleaning. The uncleaned gas causes an air pollution problem when it is burned and the products of combustion are released to the atmosphere. Also, uncleaned byproduct gas causes corrosion because $P_2O_5$ is formed by the combustion of phosphorus. Processes are disclosed for cleaning the byproduct gas to remove elemental phosphorus and to permit the gas to be used as fuel in the still.

The quantities and compositions of B.I. material collected at two furnaces operated at the TVA National Fertilizer Development Center are given in table 3.

TABLE 3

| Quantity and Composition of B.I. Material | | | |
|---|---|---|---|
| | Furnace No. | | Value |
| | 2 | 6 | taken |
| B.I. material, tons per ton phosphorous produced. | 0.024 | 0.086 | 0.055 |
| Analysis, percent dry basis | | | |
| $P_2O_5$ | 26.3 | 24.4 | 25.4 |
| CaO | 8.4 | 9.6 | 9.0 |
| $SiO_2$ | 5.3 | $0.3^a$ | 5.3 |
| $Fe_2O_3$ | 6.3 | 5.8 | 6.1 |
| $Al_2O_3$ | 2.1 | 2.6 | 2.4 |
| F | 26.3 | 29.3 | 27.8 |
| Total | 74.7 | 72.0 | 76.0 |

$^a$Analysis assumed to be in error.

The lack of agreement in quantity of B.I. material collected at the No. 2 and No. 6 furnaces was attributed to different operating conditions at the two furnaces. Another possibility is that the electrostatic precipitator at the No. 6 furnace was not effectively removing dust from the furnace gas stream. The rate of collection of B.I. material of 0.055 ton per ton of phosphorus may be a representative figure.

Analyses of the B.I. materials generally agree. The total of the constituents indicated account for about three-fourths of the constituents present. Part of the unaccounted-for material may be small particles of carbon which became entrained in the furnace gas and were collected in the condensing system. The $SiO_2$:CaO weight ratio of the B.I. was 0.59, which is less than the ratio required for smelting. Silica rock is normally added to furnace feed mixtures to increase the $SiO_2$:CaO weight ratio to about 0.85 when phosphate ore is smelted. If the B.I. material is smelted, about 2.53 tons of silica rock will be required per 100 tons of B.I. material. The percent $P_2O_5$ in the phosphate plus silica will be about 24.8. However, the agglomerated material will be substantially upgraded by the use of phosphoric acid in the low-temperature agglomeration process. Therefore, agglomerated B.I. material has value for upgrading unbeneficiated phosphate ore.

Particulates are removed from furnace gases by electrostatic precipitators, as discussed above. A precipitator is shown in FIG. 1 in patent application Ser. No. 503,099. Material collected in the precipitators, called precipitator dust, consists of very small particles. Electrostatic precipitators are not installed at all furnaces, and at furnaces without precipitators all the particulates are collected in the condensers and the quantity of B.I. material will be greater than that shown in table 3.

Precipitator dust contains elemental phosphorus, but the percentage varies from a few tenths to about 4 percent. The handling and treating of precipitator dust is hazardous because the phosphorus burns spontaneously upon exposure to air. Also, combustible gases adsorb on the surfaces of the dust and these adsorbed gases burn in air. The material is frequently flushed from the precipitator as a water slurry to decrease the hazards. Dust slurries are stored in ponds, causing special environmental and safety hazards. The wet material may dry out and ignite releasing voluminous clouds of smoke. The precipitator dust slurry is acidic, and fluorine is emitted from the ponds unless the slurry is neutralized with an alkaline substance. Accidental release of the precipitator dust slurry into watercourses can be a major hazard to marine life.

The quantity of precipitator dust collected at the furnaces operated at the TVA National Fertilizer Development Center for a 10-day test period is given in table 4. The results given in table 3 were based on the same 10-day test period as that given in table 4. Table 4 gives the composition of the precipitator dust on a dry, phosphorus-free basis.

TABLE 4

Quantity and Composition of Precipitator Dust Collected at Phosphorus Furnaces

| | Furnace No. | | Value |
|---|---|---|---|
| | 2 | 6 | taken |
| Precipitator dust collected, tons per ton phosphorus produced | 0.070 | 0.054 | 0.062 |
| Analysis of precipitator dust, percent | | | |
| $P_2O_5$ | 26.9 | 28.5 | 27.7 |
| CaO | 16.8 | 10.7 | 13.8 |
| $SiO_2$ | 16.5 | 18.1 | 17.3 |
| $Fe_2O_3$ | 1.8 | 1.5 | 1.7 |
| $Al_2O_3$ | 3.7 | 3.4 | 3.6 |
| F | 6.7 | 5.9 | 6.3 |
| $K_2O$ | 18.6 | 16.2 | 17.4 |
| MgO | 0.9 | 0.8 | 0.9 |
| $MnO_2$ | 0.1 | 0.1 | 0.1 |
| $Na_2O$ | 2.9 | 3.3 | 3.1 |
| S | 0.1 | 0.1 | 0.1 |
| Total | 95.0 | 88.6 | 92.0 |

The quantity of precipitator dust collected was about the same as the quantity of B.I. material as shown in table 3. The quantities collected at the two furnaces were in reasonably close agreement, as were the analyses.

The $P_2O_5$ content of the precipitator dust was somewhat higher than that for the B.I. material, and the $SiO_2$:CaO weight ratio was higher than for B.I. material. More than enough $SiO_2$ was present to flux the CaO. The percent $P_2O_5$ in the phosphate plus silica was 27.7, as compared with 24.8 percent for the B.I. material.

Precipitator dust slurry can be treated in the still shown in FIG. 4 and a dry, phosphorus-free solid will be obtained as residue in the still. After treatment the precipitator dust can be combined with B.I. material, agglomerated by the low-temperature process, and smelted in the furnace. Both wastes are thereby recycled to the furnace and the $P_2O_5$ is recovered. Recycling these wastes increases the $P_2O_5$ recovery at a phosphorus furnace about 1.1 percent.

It was assumed phosphoric acid sludge will be used to agglomerate the mixture of B.I. material and precipitator dust. Composition of this sludge is given in table 2. In the agglomeration process the acidic mixture is neutralized with ground phosphate, and water is added in accordance with a formulation used in the laboratory to agglomerate minus 6-mesh phosphate ore. The composition of the resulting agglomerates was calculated to be as shown in table 5.

TABLE 5

Composition of Agglomerates Prepared from Mixture of B.I. Material and Precipitator Dust

| Constituent | Percent |
|---|---|
| $P_2O_5$ | 30.5 |
| CaO | 12.8 |
| $SiO_2$ | 9.3 |
| $Fe_2O_3$ | 3.4 |

The $SiO_2$:CaO weight ratio is 0.73 and silica rock is required to increase the ratio to 0.85 in order to provide enough $SiO_2$ for smelting. The $P_2O_5$ content of the phosphate plus silica mixture was calculated to be 30.0 percent, and about 1.9 percent of the phosphorus produced will be derived from the agglomerated wastes.

The agglomerated mixture of B.I. material and precipitator dust has a grade high enough to have value in upgrading unbeneficiated phosphate ore. Phosphorus furnace operation is thereby improved by recycling the wastes when the wastes are agglomerated by the low-temperature process. Furthermore, unbeneficiated phosphate ore can be further upgraded by using a larger than needed quantity of phosphoric acid sludge in the low-temperature agglomeration process.

FIG. 5 is a diagram to illustrate the process for recycling the B.I. material. Precipitator dust is recycled by a similar process, or a mixture of the two wastes is recycled. In FIG. 5, phosphate ore 19 is agglomerated by the low-temperature process. Phosphoric acid 69 and ground phosphate 20 are added to agglomerator 21. B.I. material which is the residue from the drum is recycled to agglomerator 21 and incorporated into agglomerates 23. Composition of the B.I. material is given in table 3.

Phosphoric acid sludge is expected to be the lowest cost phosphoric acid available for use in agglomeration because it contains more impurities than the other forms of acid. For this reason, phosphoric acid sludge may be preferred over the other acids. Filter-grade wet-process phosphoric acid is another low-cost acid and it can be used for agglomeration.

Flotation tailings can be added to agglomerator 21 to provide silica needed in smelting phosphate ore, although addition of this material to the agglomerator is not shown in FIG. 5. Flotation tailings is a silica-rich waste material obtained when phosphate ore is beneficiated. The $P_2O_5$ in the waste is recovered when the agglomerates are smelted.

The process shown in FIG. 5 can be further modified by agglomerating reducing carbon instead of phosphate ore. A further modification of the process may include agglomeration of phosphate ore at high temperatures, feeding the reducing carbon and silica rock as lump materials, and using agglomerator 21 to agglomerate the B.I. material and precipitator dust.

Significant upgrading of the phosphate feed mixture occurs when phosphate ore is agglomerated by the low-temperature process. The phosphoric acid used in agglomeration contains a high percentage of $P_2O_5$, and the percent $P_2O_5$ in the phosphate plus silica is thereby increased. Unbeneficiated phosphate ores contain 23 to 24 percent $P_2O_5$ on the phosphate plus silica basis, and upgrading to the range of 26 to 28 percent is needed to obtain satisfactory furnace operation. The formulation in the low-temperature agglomeration process can be adjusted to use more phosphoric acid than actually needed for agglomeration to achieve control over upgrading. The optimum upgrading with phosphoric acid depends on the economics of the phosphorus furnace process. In some cases, enough phosphoric acid may be used to increase the $P_2O_5$ in the phosphate plus silica to the range of 28 to 30 percent.

The disclosures have emphasized recovery of phosphorus-containing wastes at plants producing elemental phosphorus and thermal phosphoric acid, the thermal phosphoric acid being defined as the acid made from elemental phosphorus. When elemental phosphorus is the only product, equipment can be installed to convert the phosphorus-containing wastes into an acidic mixture as in FIG. 3. Phosphorus producers may have extensive investment in high-temperature agglomeration facilities, and it may not be expedient to agglomerate phosphate ore by the low-temperature process. In this case the process disclosed in FIG. 5 may be preferred. The environmental problems encountered during the handling and storing of phosphorus-containing wastes are avoided in the processes shown in both FIG. 3 and FIG. 5, both of which recycle the wastes to the smelting furnace.

Phosphorus-containing wastes are stored at sites where neither elemental phosphorus nor thermal phosphoric acid is produced. The TVA National Fertilizer Development Center is an example. Production of phosphorus was discontinued at the Center in 1976 but phosphorus sludge and phosphorus-containing wastes were left in tanks, sumps, drums, and in a 14-acre settling pond without means for treating or recycling the hazardous material.

The phosphorus-containing waste can be treated in a still in FIG. 4 to separate phosphorus from the solids and obtain a phosphorus-free residue. Nitrogen is used as purge gas because byproduct furnace gas is not available at the Center. Fuel used in the still is natural gas. Orthophosphate suspension fertilizer is produced at the Center and the condenser bleedoff water can be recovered in this fertilizer as disclosed in U.S. Pat. No. 4,383,847. The elemental phosphorus recovered from the phosphorus-containing wastes is distributed as a commercial product.

The phosphorus-free residue remaining in the still can be converted into granular fertilizers provided the concentration of toxic materials in the waste is low enough for fertilizer use. Facilities are available at the Center to produce granular fertilizers.

The phosphorus-containing wastes at the Center have been stored for decades in various containers, some of which are open such as sumps, ponds, and drums. Phosphorus ignites and causes a serious air pollution problem when the waste is exposed to air. The waste is covered with water to prevent burning, but the water used to blanket the material is a potential water pollutant because it contains elemental phosphorus. The water may be inadvertently discharged to watercourses, or ponds and sumps may leak. Furthermore, the wastes may contain toxic materials which were inadvertently discarded. Open containers such as sumps, ponds, and drums provide convenient receptacles for discharging miscellaneous wastes, and some of these wastes may contain toxic substances. For example, wastes may contain principal organic hazardous constituents (POHCs) as a result of the "catchall" feature of open container storage. Phosphorus-containing waste in the 14-acre pond at the Center was purposely covered with waste material from a coal-fired boiler, and this increases the probability of contamination with toxic metals.

Phosphorus-containing wastes at other places may contain POHCs and toxic metals in addition to elemental phosphorus. Provision should be made to recycle the wastes in accordance with processes disclosed in FIGS. 3 and 5. Granulation of residue in the still for fertilizers should be considered only after it is determined that the concentration of toxic materials is low enough for the material to be used in fertilizers.

Toxic organic chemicals may vaporize in the still and they will condense with the water. The bleedoff stream shown as item 32 in FIG. 4 may be contaminated with the organic chemicals, and in this case the bleedoff water may be unacceptable for use in suspension fertilizers. Water is included in the formulations for low-temperature agglomeration of phosphate ore and reducing carbons, as discussed in U.S. Pat. Nos. 4,372,929 and 4,421,521. The contamined bleedoff water can be used in the low-temperature agglomeration processes to recycle toxic organic chemicals and prevent these chemicals from entering the environment.

When the furnace feed materials are smelted in the submerged-arc electric furnace the metals in this materials are combined in the slag. The slag is tapped from the furnace as a molten material at a temperature of 2650°–2700° F. (1454°–1482° C.). Slag is an inorganic, insoluble material used as ballast, and the combined metals are not objectionable. Toxic metals combined in the slag are not hazardous because they are incorporated in the mass of fused material.

Some of the metals in the furnace feed materials are reduced to the element and the metal alloys with the ferrophosphorus. The ferrophosphorus is an inorganic, insoluble, metallic-like substance used in metallurgy. Toxic metals present in ferrophosphorus normally do not affect its use in metallurgy, but large concentrations of metal impurities may prevent this use. Ferrophosphorus containing large concentrations of metal impurities may be used as ballast, and the presence of toxic metals can be tolerated.

Metals are insoluble in liquid phosphorus. Phosphoric acid made from high quality phosphorus has a metals:-$P_2O_5$ ratio in the range of 0.00060 to 0.00080, indicating little metals contamination even though the acid is produced in a stainless steel facility.

Organic chemicals are decomposed by the high temperatures in the submerged-arc electric furnace. But some of the organic materials volatilize from the furnace and are discharged in the furnace gas stream. The organic chemicals are condensed in the precipitator dust, condenser water, or B.I. material. Processes disclosed in the present application provide for recycling these wastes, and the organic constituents are thereby recycled. Toxic organic chemicals are prevented from entering the environment by recycling.

Organic chemicals may dissolve in liquid phosphorus. When the phosphorus is burned to produce thermal phosphoric acid, the organic materials are heated to high temperatures. Phosphorus flame temperatures were calculated for various percentages of excess air. Results of the calculations are shown in table 6.

TABLE 6

Estimated Phosphorus Flame Temperatures

| Excess air, percent | Calculated max. temp., °C. | Estimated actual temp., °C. |
|---|---|---|
| 0 | 3100 | 2700 |
| 10 | 2900 | 2550 |
| 25 | 2650 | 2300 |
| 50 | 2300 | 1950 |
| 100 | 1700 | 1500 |
| 150 | 1450 | 1300 |
| 200 | 1250 | 1100 |
| 300 | 1000 | 900 |

Table 6 shows that the phosphorus flame temperature is about 2700° C. with theoretical air, but it is impractical to obtain complete combustion without use of more than the theoretical quantity of air. The publication, "A High-Temperature Superphosphoric Acid Plant", Industrial and Engineering Chemistry, volume 59, No. 6, June 1967, describes a thermal phosphoric acid plant and gives data on the operation. The usual excess air at this unit was in the range of 10 to 25 percent, and from table 6 the flame temperature was in the range of 2300° to 2550° C. (4172° to 4622° F.).

The Environmental Protection Agency performance standards for land-based incinerators call for 99.99 percent destruction of liquid hazardous wastes. If the wastes consist of polychlorinated biphenyls, dibenzodioxins, or dibenzofurans, destruction efficiencies of 99.9999 percent must be demonstrated for acceptable incineration. A recent publication, "Circulating Bed Incineration of Hazardous Wastes," Chemical Engineering Progress, March 1985, demonstrated that a circulating bed incinerator destroyed more than 99.999 percent of a variety of POHC. The temperature range was 790° to 870° C. (1454° to 1598° F.). The thermal phosphoric acid unit described in the enclosed publication is expected to destroy 99.9999 percent of the organic compounds dissolved in the phosphorus and thereby meet the Environmental Protection Agency requirements for toxic organic chemicals. However, tests have not been carried out to determine how much organic matter is destroyed in the phosphoric acid unit. The basis for assuming such efficient destruction of the organic compounds is the high flame temperature when phosphorus is burned. Flame temperatures in the thermal phosphoric acid unit are 1400° to 1800° C. higher than the circulating bed incinerator which achieved more than 99.999 percent destruction of POHCs.

The combination phosphorus furnace-thermal phosphoric acid unit is proposed as a means for destroying toxic wastes associated with phosphorus sludge. Solid wastes can be incorporated in the furnace feeds by low-temperature agglomeration. Toxic metals are rendered innocuous by smelting wherein the metals are fused with the slag or are alloyed in the ferrophosphorus. Toxic liquids are included in the formulation for making the low-temperature agglomerates. All wastes are recycled to the smelting furnace. Organic compounds dissolved in the phosphorus are destroyed when the organic materials are subjected to high temperatures from the combustion of phosphoric acid. The thermal phosphoric acid may contain 78 to 80 percent $P_2O_5$, and in such highly concentrated phosphoric acid 75 to 85 percent of the $P_2O_5$ is in the polyphosphate form. The phosphoric acid is used to make liquid fertilizers with high polyphosphate content.

Processes are disclosed for treating phosphorus-containing wastes with and without phosphorus and thermal phosphoric acid production facilities. Wastewater containing elemental phosphorus can be used to make suspension fertilizers, and residue obtained after distilling phosphorus sludge can be converted into granular fertilizers. If the phosphorus-containing waste contains toxic materials—metals or organic chemicals—a combination phosphorus furnace-thermal phosphoric acid unit can be used to meet the Environmental Protection Agency requirements. It is evident that the present application discloses processes for treating toxic wastes, even though the toxic materials are not associated with phosphorus-containing materials. Toxic materials are destroyed simultaneously with the production of phosphoric acid suitable for use in fertilizers.

DESCRIPTION OF THE DRAWINGS

Five figures are given to aid in understanding the disclosures of the present application.

Figures 1, 2:
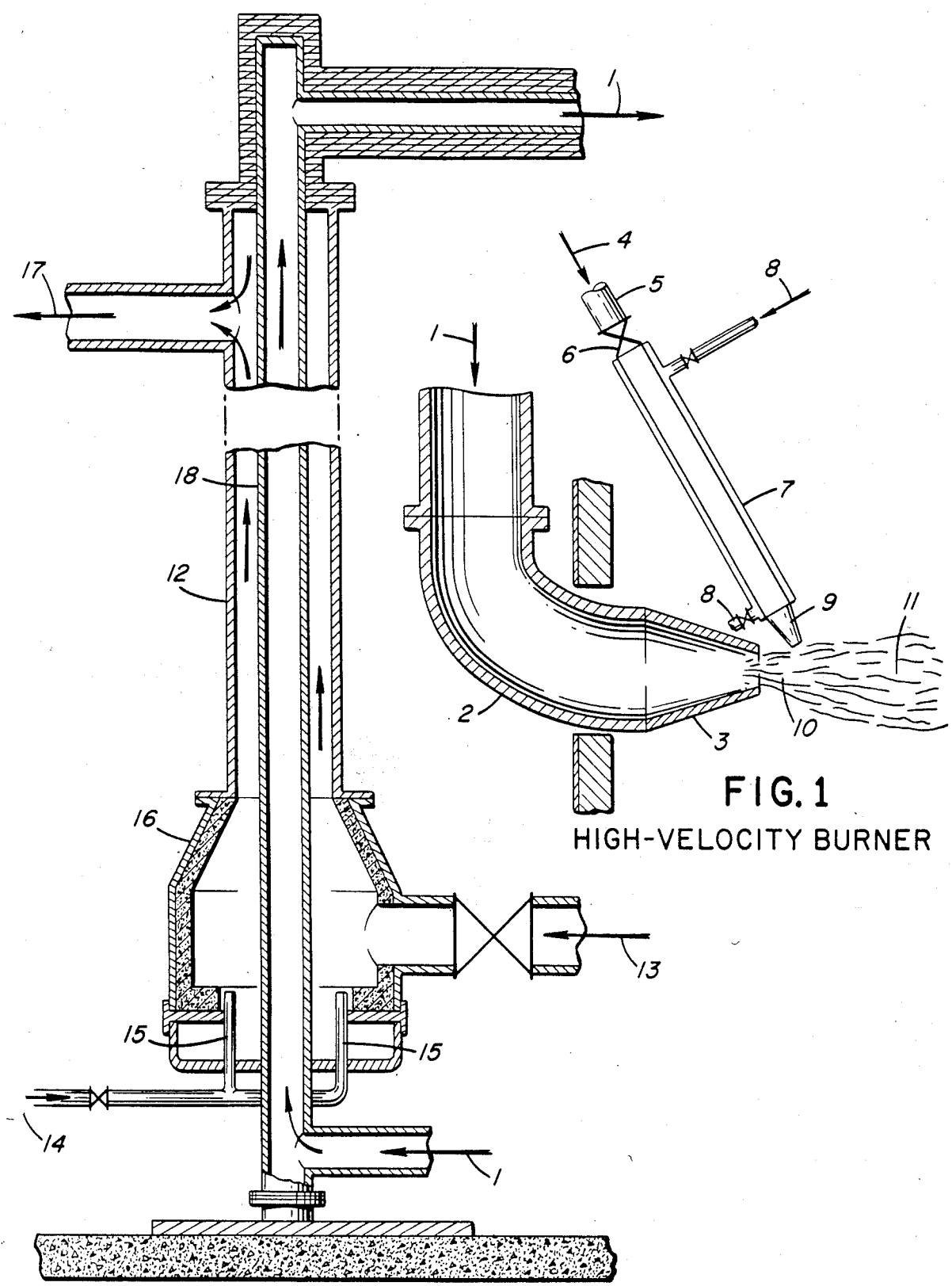
FIG. 1 is a diagram of a high-velocity burner constructed to disintegrate phosphorus sludge. Air 1 from an air heater shown as FIG. 2 flows into burner 2. The air velocity is substantially increased by nozzle 3. Sludge 4 flows through valve 6 into jacketed section of pipe with jacket shown as 7. Sludge is thereby heated by steam 8 flowing through jacket 7 and steam is discharged as condensate 8. The stream of sludge flows through nozzle 9. Velocity of the stream is sufficient to result in the penetration of sludge into the stream of air at 10. Sludge is dispersed into discrete particles from velocity head of air 1. Sludge burns forming flame shown as 11. A mixture of oxides—$P_2O_5$ and $P_2O_3$—is formed when the sludge burns.
FIG. 2 is an air heater indicated by 12. Air 1 flows into air heater from a compressor not shown in the figure. Combustion air 13 flows into heater from a blower not shown in FIG. 2. Natural gas 14 flows from a pipeline to burners shown as 15. Natural gas is burned in furnace 16; combustion gases flow inside pipe 12 and leave the heater at 17. The combustion gases are discharged into the atmosphere through a stack not shown in FIG. 2. Air 1 flows through pipe 18 and is discharged as heated air 1.
Figure 3:
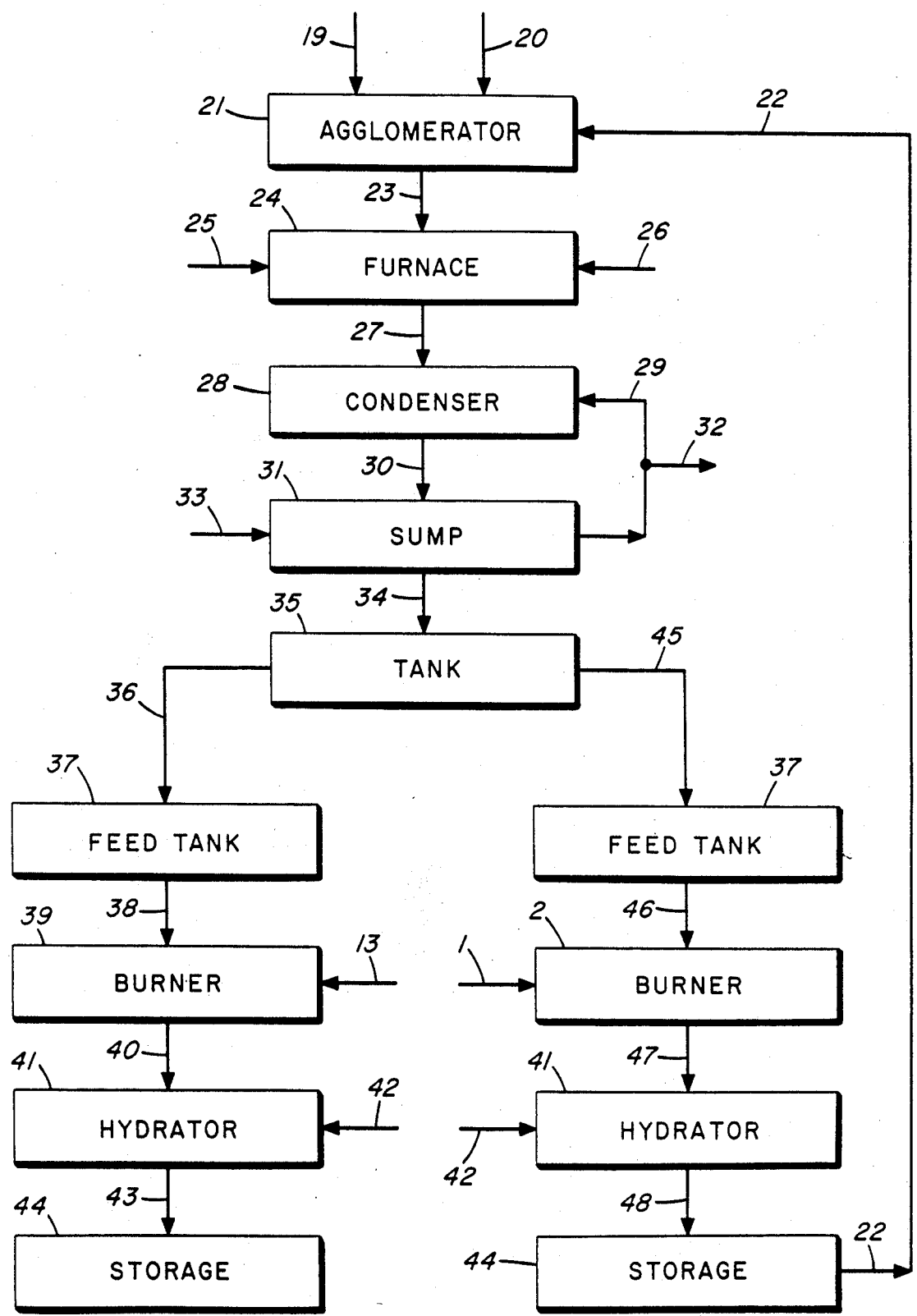
FIG. 3 is a diagram of a process to make phosphoric acid wherein high-velocity burner shown in FIG. 1 and air heater shown in FIG. 2 are used. Phosphate ore 19 and ground phosphate 20 are fed into agglomerator 21. A mixture of phosphoric and phosphorous acids 22 is fed into agglomerator 21. Indurated agglomerates 23 are fed into a submerged-arc electric furnace 24. Silica rock 25 and reducing carbon 26 are fed into furnace 24. Furnace gases 27 flow into condenser 28 where the gases are adiabatically cooled by water 29. Item 30 is a mixture of phosphorus, phosphorus sludge, and water which flows into condenser sump 31. Water is separated from phosphorus and phosphorus sludge in sump 31 and is recycled to adiabatic condenser 28 where it is sprayed into the gas to saturate it. A bleedoff stream 32 is used to make orthophosphate suspension fertilizer wherein nutrients in the bleedoff stream are recovered. Makeup water 33 is added to sump 31. The mixture of phosphorus and phosphorus sludge collected in sump 31 is pumped through line 34 to tank 35. Phosphorus is separated from sludge in tank 35 by gravitational settling. Phosphorus settles to the bottom of tank 35 and is removed from the tank by a pump not shown in FIG. 3. The pump is located in a well in the bottom of tank 35. Phosphorus is pumped through line 36 to feed tank 37 and phosphorus flows through line 38 to burner 39. Combustion air 13 is supplied by a blower not shown in FIG. 3. Gases from burner 39 flow through line 40 to hydrator 41. Water 42 is added to hydrator 41 to combine with $P_2O_5$ and form phosphoric acid. Phosphoric acid flows through line 43 to storage 44.

This sludge is pumped from tank 35 through line 45 to feed tank 37. Sludge is pumped through line 46 to burner 2 supplied by air 1. Gases from burner 2 flow through line 47 to hydrator 41. Water 42 is added to hydrator 41 to form phosphoric and phosphorous acids from $P_2O_5$ and $P_2O_3$. These phosphorus oxides are formed by the combustion of phosphorus sludge by burner 2. The mixture of phosphoric and phosphorous acids flows through line 48 to storage 44. The mixture of phosphoric and phosphorous acids designated as 22 is fed to agglomerator 21.

Figure 4:
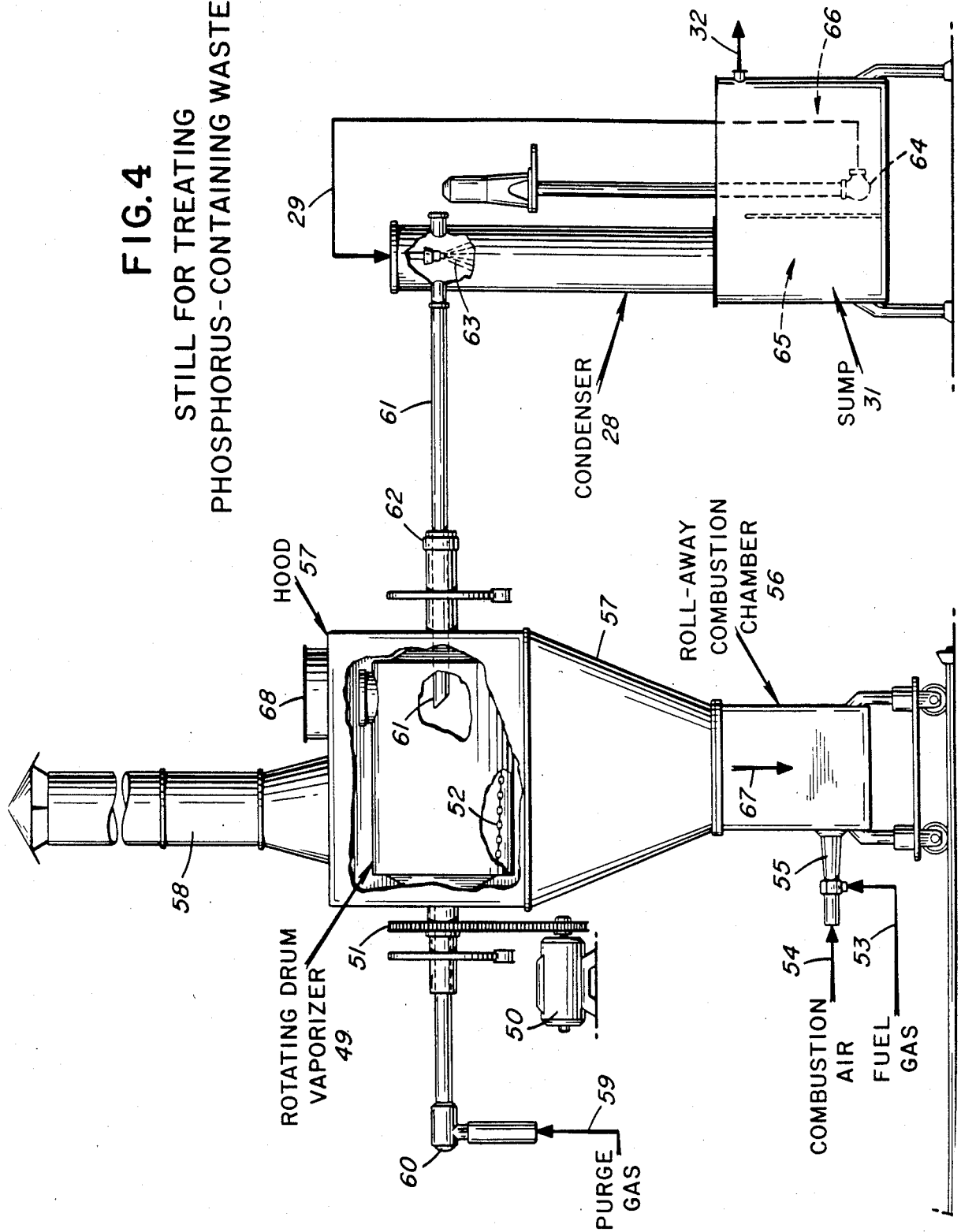

A still for vaporizing phosphorus-containing wastes is shown in FIG. 4. Batches of phosphorus-containing wastes are placed in drum 49 and the drum is heated from the outside to vaporize the phosphorus in the sludge. Drum 49 is rotated by motor 50 and rotating mechanism 51. A chain 52 is installed in drum 49 to keep the material from caking while it is being heated. Heat for the vaporization of the phosphorus is provided by the combustion of a fuel gas 53. Combustion air 54 and fuel gas 53 are mixed in burner 55 and combustion occurs in combustion chamber 56. Combustion chamber 56 can be rolled away to remove contents of drum 49. Hot gases flow around drum 49 and the gases are discharged to the atmosphere through stack 58. Purge gas 59 is added through rotary joint 60. Purge gas is nonoxidizing. Phosphorus vapor is swept from drum 49 by the flow of nonoxidizing gas.

A mixture of gases is discharged from the drum and the mixture contains phosphorus vapor, water vapor, and purge gas. The mixture of gases flows through pipe 61 and through rotary seal 62 into condenser 28. The gas mixture is adiabatically cooled by water 29. Water vapor and phosphorus vapor are condensed by contact with water spray 63. A mixture of water and phosphorus drains into condenser sump 31. Water 29 is separated from the phosphorus in sump 31 and the water is recycled to condenser 28 by means of pump 64. Item 65 is the phosphorus compartment of sump 31 and 66 is the water compartment. Item 32 is a bleedoff stream of the recirculating water 29. Bleedoff stream 32 contains dissolved elemental phosphorus and particles of elemental phosphorus in suspension, and this stream is used to make 11-39-0 suspension fertilizer by a process not shown in FIG. 4.

Phosphorus collected in compartment 65 is transported to storage by means not shown in FIG. 4.

Combustion chamber 56 is rolled away after phosphorus has been volatilized from the phosphorus-containing waste. Residue 67 is discharged from drum 49 and a fresh batch of waste is added through port 68.

Figure 5:
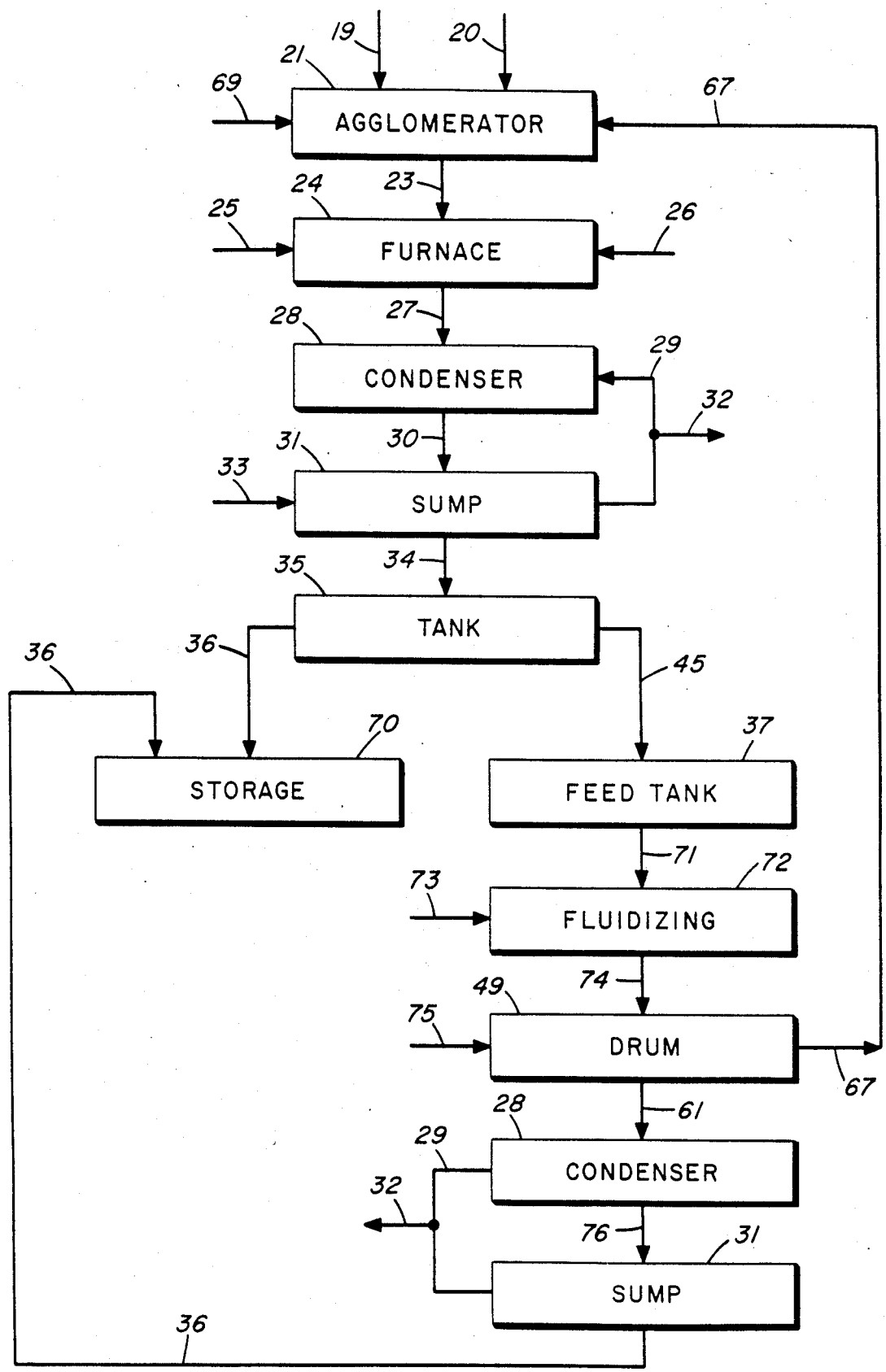

FIG. 5 illustrates a process for making phosphorus. Residue 67 in FIG. 4 is fed to agglomerator 21. Phosphate ore 19, ground phosphate 20, and phosphoric acid 69 are fed to agglomerator 21. The materials are mixed and tumbled to form agglomerates and the agglomerates are indurated by heating. Indurated agglomerates 23 are fed into the furnace 24. Silica rock 25 and reducing carbon 26 are fed into furnace 24. Furnace gases 27 flow into condenser 28 where the gases are adiabatically cooled by water 29. Item 30 is a mixture of phosphorus, phosphorus sludge, and water which flows into sump 31. Water 29 is separated from phosphorus and phosphorus sludge in sump 31 and is recycled to adiabatic condenser 28 where it is sprayed into the gas mixture. A bleedoff stream 32 is used to make orthophosphate suspension fertilizer. Makeup water 33 is added to condenser sump 31. The mixture of phosphorus and phosphorus sludge collected in condenser sump 31 is pumped through line 34 to tank 35 wherein phosphorus is separated from phosphorus sludge by gravitational settling. Phosphorus settles to the bottom of tank 35 and is removed by pumping. Phosphorus is pumped through line 36 to storage 70.

Phosphorus sludge is pumped from tank 35 through line 45 to feed tank 37. Phosphorus sludge is transported by line 71 to fluidizing 72. An alkaline surfactant 73 is added to fluidizing 72. Phosphorus slidge is pumped through line 74 to drum 49. Purge gas 75 is added to drum 49 and residue 67 is recycled to agglomerator 21. Gases from drum 49 flow through pipe 61 to condenser 28. Gases are cooled by water 29. A mixture of phosphorus and water drains through line 76 into sump 31. Water 29 is separated from phosphorus in sump 31 and water is recycled to condenser 28. Bleedoff stream 32 is used to make suspension fertilizer by a process not shown in FIG. 5. Phosphorus is pumped through line 36 to storage 70.

PRIOR ART

Reference is made to the prior art given in application Ser. No. 223,122, now U.S. Pat. No. 4,372,929; application Ser. No. 301,378, now U.S. Pat. No. 4,383,847; and application Ser. No. 428,840, now U.S. Pat. No. 4,451,277. The following additional prior art is included in the present application.

U.S. Pat. No. 3,050,374, Aug. 21, 1962, "Phosphorus Burner Assembly," R. B. Burt and James C. Barber.

U.S. Pat. No. 4,081,333, Mar. 28, 1978, "Method and Apparatus for Distillation," William Samuel Holmes, Edward James Lowe, and Ernest Reginal Brazier.

U.S. Pat. No. 4,421,521, Dec. 20, 1983, "Process for Agglomerating Carbon Particles," James C. Barber.

U.S. Pat. No. 4,492,627, Jan. 8, 1985, "Recovery of Phosphorus from Waste Ponds," David A. Crea.

The following publications are enclosed in the present application.

1. "Corrosion Problems in the Manufacture of Phosphoric Acid," J. C. Barber, Corrosion 14, 21–26 (August 1958).

2. Chemical Engineering Report No. 2, "Development of Processes and Equipment for Production of Phosphoric Acid," M. M. Striplin, Jr., 1948, Tennessee Valley Authority, Muscle Shoals, Ala. 35660.

3. Chemical Engineering Report No. 3, "Production of Elemental Phosphorus by the Electric-Furnace Method," R. B. Burt and J. C. Barber, 1952, Tennessee Valley Authority, Muscle Shoals, Ala 35660.

4. Chapter VII.2 entitled "Solid Wastes from Phosphorus Production," J. C. Barber, from the book, "Solid Wastes," edited by C. L. Mantell, John Wiley and Sons, Inc., publishers, copyright 1975.

5. "A High-Temperature Superphosphoric Acid Plant," H. Y. Allgood, F. E. Lancaster, Jr., J. A. McCollum, and J. P. Simpson, Industrial and Engineering Chemistry 59, No. 6, 18–28 (June 1967).

EXAMPLE I

A small phosphorus furnace was operated for a 10-day period to obtain heat and material balance data. The nominal powerload was 8500 kW and the average powerload was 8460 kW. Phosphorus, phosphorus sludge, and condensor water were collected in a sump in accordance with the normal procedure for operating the furnace. The sump arrangement is illustrated in FIG. 91 in Chemical Engineering Report No. 3. Condenser water was separated from the phosphorus and phosphorus sludge in the sump and the water was recycled to the condenser. Phosphorus was collected in the compartment under the condenser and phosphorus sludge was collected in the middle compartment. Special measurements were made to determine the quantities of phosphorus and phosphorus sludge produced during the tests. Materials in the two compartments were sampled and analyzed to determine their compositions. From these measurements and analyses the quantities of phosphorus and phosphorus sludge produced were calculated to be as follows.

|  | Tons per day |
|---|---|
| Phosphorus | 14.0 |
| Phosphorus sludge | 3.6 |

Analyses of the two materials are given in Table 7.

TABLE 7
Analyses of Phosphorus and Phosphorus Sludge

|  | Phosphorus, percent | Phosphorus sludge, percent |
|---|---|---|
| Elemental phosphorus | 99.5 | 90.5 |
| $P_2O_5$ | 0.1 | 2.5 |
| CaO | <0.1 | 0.8 |
| $SiO_2$ | <0.1 | 0.5 |
| $Fe_2O_3$ | <0.1 | 0.6 |
| $Al_2O_3$ | <0.1 | 0.2 |
| F | 0.1 | 2.5 |

The following calculations were made to determine the proportions of elemental phosphorus collected in the phosphorus compartment and in the phosphorus sludge compartment.

$14.0 \times 0.995 = 13.93$ tons per day $3.6 \times 0.905 = \underline{3.26}$ tons per day Total $\quad$ 17.19 tons per day $\frac{13.93}{17.19} \times 100 = 81.0$ percent of the elemental phosphorus was collected in phosphorus compartment.

$\frac{3.26}{17.19} \times 100 = 19.0$ percent of the elemental phosphorus was collected in the phosphorus sludge compartment.

EXAMPLE II

A test was made in which all the phosphorus and phosphorus sludge produced at the National Fertilizer Development Center for one day was pumped to an empty storage tank. The mixture settled for approximately 24 hours. Samples of the phosphorus and phosphorus sludge layers were sampled at various times to determine the rate of settling.

A pump was installed in a well in the bottom of the storage tank. After 24 hours' settling the bottom phosphorus layer was pumped to phosphorus storage. When the phosphorus layer was removed, the phosphorus sludge was removed from the storage tank by pumping to phosphorus sludge storage by means of the same pump used to pump out the phosphorus layer. Less than 10 percent of the phosphorus produced was recovered as phosphorus sludge, as compared with the 19 percent figure given in example I. The proportion of phosphorus recovered as phosphorus sludge was reduced substantially and the percentage phosphorus in the phosphorus sludge was much less than the 90.5 percent figure obtained in example I.

EXAMPLE III

A procedure was adopted for separating phosphorus from phosphorus sludge as described in example II. Two phosphorus storage tanks were used exclusively as receptacles for the mixture. These tanks were numbered 5 and 6. A sight glass was installed in the line from each tank; Therefore, material being removed from a tank could be observed. Phosphorus was separated from phosphorus sludge by the following procedure.

1. All the phosphorus and phosphorus sludge produced for a single day was pumped to either No. 5 or No. 6 tank. The tank was empty before phosphorus and phosphorus sludge was pumped to it.
2. Mixture in the tank was allowed to settle until the next day.
3. Phosphorus layer was pumped to phosphorus storage tank through sight glass.
4. Liquid flowing through sight glass was observed. The phosphorus was a yellow liquid; phosphorus sludge layer was a black liquid.
5. Pumping to phosphorus storage was stopped when liquid in sight glass changed from yellow to black.
6. Phosphorus sludge layer was pumped to a tank used to store this material.
7. Tanks 5 and 6 were used on alternate days to separate phosphorus from phosphorus sludge.

After 12 days' operation with the procedure described above, an average of 7.3 percent of the phosphorus was recovered as phosphorus sludge. The phosphorus separated from the phosphorus sludge contained an average of 99.6 percent elemental phosphorus.

EXAMPLE IV

Phosphorus separated from phosphorus sludge as described in example III was burned in a stainless steel phosphoric acid unit. A sample of the acid was analyzed and the results are given in table 8.

TABLE 8
Analysis of Phosphoric Acid Made from Settled Phosphorus

| Constituent | Percent by weight |
|---|---|
| $P_2O_5$ | 79.9 |
| Fe | 0.001 |
| Al | 0.001 |
| Cr | None |
| Ni | 0.001 |
| Mo | None |
| As | 0.001 |
| Pb | 0.0002 |
| $SiO_2$ | 0.001 |
| CaO | 0.0004 |

TABLE 8-continued

| Analysis of Phosphoric Acid Made from Settled Phosphorus | |
|---|---|
| Constituent | Percent by weight |
| F | 0.01 |
| Cl | None |
| S | 0.002 |

The weight ratio F to $P_2O_5$ in the phosphoric acid was 0.000125 and the weight ratio of the total metals to $P_2O_5$ was about 0.00006.

Distribution of the $P_2O_5$ among various species of phosphoric acid was as follows.

| | Percent |
|---|---|
| Ortho | 17.5 |
| Pyro | 40.1 |
| Tripoly | 22.1 |
| Tetrapoly | 11.5 |
| Pentapoly | 5.6 |
| Hexapoly | 2.1 |
| Heptapoly | 1.2 |

EXAMPLE V

Flotation tailings is a waste material obtained during the benefication of phosphate ore, and it has the following approximate composition.

| | Percent |
|---|---|
| $P_2O_5$ | 4.0 |
| CaO | 5.0 |
| $SiO_2$ | 90.0 |
| $Fe_2O_3$ | 0.3 |
| $Al_2O_3$ | 0.8 |

The material contains a large percentage of $SiO_2$ and a small percentage of CaO. Consequently, the material can be used as a source of $SiO_2$ and the phosphate value is recovered. Flotation tailings are comprised of small sized particles and the material must be agglomerated before it can be fed to a phosphorus furnace. Feeding unagglomerated flotation tailings will result in entrainment of the small sized material in the furnace gas.

The flotation tailings can be agglomerated by the low-temperature process. Phosphoric acid sludge may be the preferred acidic material to use in the agglomeration process. In accordance with the present example a mixture of phosphoric acid sludge, ground phosphate ore, and flotation tailings is tumbled in a rotating cylinder to form the wet agglomerates. The agglomerates are indurated by heating in the range of 240° to 900° F. in a nonagitated heating device. No agglomerating experiments have been made, but the following formulation is adequate to prepare the agglomerates.

100 parts flotation tailings
10 parts water
13 parts phosphoric acid sludge containing 45.6 percent $P_2O_5$

EXAMPLE VI

Coke fines were agglomerated by tumbling a mixture of ground phosphate, phosphoric acid, water, and coke fines in a rotating cylinder. The ground phosphate had the following composition.

| | Percent |
|---|---|
| $P_2O_5$ | 31.1 |
| CaO | 46.6 |
| $Fe_2O_3$ | 2.6 |
| $SiO_2$ | 7.3 |

The phosphoric acid was merchant-grade wet-process phosphoric acid which contained 53 percent $P_2O_5$.

Wet-process phosphoric acid is produced by digesting phosphate ore with sulfuric acid. The resulting slurry is filtered. The filtrate is called filter-grade wet-process phosphoric acid, and it contains 28 to 32 percent $P_2O_5$. This acid is concentrated by evaporation to produce merchant-grade wet-process phosphoric acid which contains 52 to 54 percent $P_2O_5$.

The formulation for the agglomeration of coke fines was as follows.

330 parts coke fines containing 8.2 percent moisture
42 parts ground phosphate
63 parts merchant-grade wet-process phosphoric acid containing 53 percent $P_2O_5$
85 parts water The wet agglomerates were indurated by heating in a laboratory oven at a temperature of 248° F.

EXAMPLE VII

A formulation is given in example II, U.S. Pat. No. 4,421,521, for the agglomeration of coke fines by tumbling a mixture of phosphoric acid sludge, aqua ammonia, and water in a rotating cylinder. The phosphoric acid sludge was the acidic material and it was neutralized with aqua ammonia. In the present example the acidic material is neutralized with ground phosphate ore.

EXAMPLE VIII

Reducing carbon used in phosphorus furnaces should be comprised of particles which are ¼-inch or larger. Anthracite coal can be used as a reducing carbon, but the lower cost coal is comprised of particles which are smaller than ¼-inch. In the present example, minus ¼-inch anthracite coal is agglomerated by the low-temperature process. However, no agglomerating experiments were made with small sized anthracite coal. The formulation is similar to that given in example V for flotation tailings.

EXAMPLE IX

Precipitator dust is comprised of particles having a size range of about one micron to a few millimeters in size. The material is amenable to agglomeration by the low-temperature process because the particles are small, although agglomerating experiments have not been carried out. In the present example, precipitator dust is agglomerated by the formulation given in example V. Precipitator dust is used instead of flotation tailings.

EXAMPLE X

The present example describes treatment of phosphorus-containing waste at the TVA National Fertilizer Development Center.

A mixture of agglomerated phosphate ore, lump metallurgical coke, and lump silica rock was smelted in a submerged-arc electric furnace. Gases volatilized from the furnace were cooled to condense the phosphorus.

The phosphorus was recovered as high-grade material and as phosphorus sludge.

The phosphorus sludge was centrifuged to coalesce the phosphorus droplets and thereby recover additional high-quality phosphorus. Overflow from the centrifuge was a slurry which contained the B.I. material as suspended particles. The centrifuge overflow contained unrecovered elemental phosphorus and it was a phosphorus-containing waste.

The centrifuge overflow was clarified by gravitational settling. Overflow from settling was used as condenser water. Underflow was a solid waste which contained elemental phosphorus.

A pilot-plant still shown in FIG. 4 was constructed to treat phosphorus-containing wastes wherein the water and phosphorus were volatilized by heating. Underflow from the settling step was treated in the still. Nitrogen gas was added to the still to purge out vaporized phosphorus and water. The gaseous mixture of nitrogen, phosphorus, and water was cooled to condense phosphorus and water. High-quality phosphorus was recovered by condensation.

The still was heated by burning natural gas. Combustion gases were discharged to the atmosphere because these gases were not pollutants. Residue remaining in the still was the B.I. material, and it was nearly phosphorus-free. This material was discarded as a waste.

EXAMPLE XI

Residue remaining in the still in example X is unsuited for disposal in landfill because it may contain elemental phosphorus. Phosphorus can be completely removed from the waste by prolonged heating, but the natural gas consumption is excessive.

The present example is a process for conserving energy for distillation, although pilot-plant experiments were not carried out as described.

Underflow from slurry settling has heated in the still to reduce the elemental phosphorus content to about 0.2 percent. Part of the furnace gas from a phosphorus furnace was used as purge gas for the still. The furnace gas was taken from the condenser exhaust. Analysis of the gas is given in table 1, and in addition to the constituents shown in the table the gas contained about 0.15 pound of elemental phosphorus per 1000 cubic feet at STP. The purge gas was enriched with elemental phosphorus as it flowed through the still, but the phosphorus content was reduced to 0.15 pound per 1000 cubic feet by cooling to 128° F. in the condenser.

The purge gas was recovered and injected in the gas main at the condenser exhaust. Therefore, purge gas cost was eliminated.

Furnace gas was cooled to 80° F. by contacting the gas with cold water. Phosphorus content of the gas was thereby reduced to about 0.02 pound per 1000 cubic feet at STP. Part of the cooled gas was used as fuel to heat the still. Combustion gases were discharged to the atmosphere. The combustion gases are not pollutants when the furnace gas contains a maximum of 0.02 pound phosphorus per 1000 cubic feet, STP.

EXAMPLE XII

In example XI a phosphorus-containing waste was heated to vaporize elemental phosphorus and the resulting residue contained a maximum of 0.2 percent phosphorus. The present example illustrates a process to recycle the waste to the submerged-arc electric furnace.

Residue containing a maximum of 0.2 percent elemental phosphorus was agglomerated by tumbling the waste with an acidic substance and said acidic substance was neutralized with an alkaline substance. Phosphoric acid sludge was the preferred acidic substance and ground phosphate ore was the preferred alkaline substance. The resulting agglomerates were wet and combustion of elemental phosphorus did not occur. However, agglomerates were indurated by heating to a temperature of approximately 250° F. When the agglomerates became dry, fumes were formed by oxidation of the phosphorus.

Gases from the heating device were scrubbed with condenser water to remove fumes. The gases were discharged to the atmosphere after fumes were removed.

The indurated agglomerates were discharged into a phosphorus furnace feed bin. Also, reducing carbon and silica rock were discharged into the feed bin. A nonoxidizing gas was prepeared by burning furnace gas with approximately theoretical air. The nonoxidizing gas was added to the feed bin to prevent the escape of furnace gas through the feed bin. Oxidation of the elemental phosphorus was prevented by the nonoxidizing gas.

The mixture of agglomerated residue, reducing carbon, and silica was fed into the furnace through the feed chutes. The mixture was smelted to produce phosphorus.

EXAMPLE XIII

A high-velocity phosphorus burner was tested at the No. 3 phosphoric acid unit at the TVA National Fertilizer Development Center. Reference is made to FIGS. 37 and 38 in the enclosed Chemical Engineering Report No. 2 for diagrams of the No. 3 phosphoric acid unit. The high-velocity burner was installed at the top of the combustion chamber, but the vaporizer was removed when the test was made.

The high-velocity burner was similar to the arrangement shown in FIG. 1. However, phosphorus was injected into the high-velocity stream of air by a pipe and nozzle installed inside the air pipe. The linear velocity of air emerging from the annular space between the phosphorus nozzle and air pipe was 300 feet per second, and sufficient air was provided to burn phosphorus at a rate of 5000 pounds per hour.

The burner was operated at phosphorus burning rates in the range of 3000 to 4250 pounds per hour. The percentage of excess air was varied from 3 to 29. The flame temperature was calculated to be about 4800° F. at 3 percent excess, but at 29 percent excess the calculated flame temperature was about 3700° F. The phosphoric acid contained less than 0.05 percent $P_2O_3$ in all the tests made with the high-velocity burner. The low $P_2O_3$ content shows that the quantity of incompletely burned phosphorus was negligible, even though the excess air was reduced to 3 percent.

Phosphorus was normally burned in the burner shown in FIG. 2 in the enclosed publication entitled "A High Temperature Superphosphoric Acid Plant." With the conventional burner, excessive amounts of $P_2O_3$ result from inadequate combustion at phosphorus rates greater than 3000 pounds per hour.

Phosphoric acid may contain the following incompletely oxidized compounds: $P_4O$, $P_2O$, $P_2O_3$, and $P_2O_4$. But analyses are usually made only for $P_2O_3$ to determine how much incompletely oxidized compounds are present in the phosphoric acid.

EXAMPLE XIV

In the present example combustion air used in the high-velocity burner is heated to increase the flame temperature. High-velocity burner is shown in FIG. 1 and air heater is shown in FIG. 2. However, operation of the high-velocity burner with preheated air has not been carried out in practice.

In example XIII, phosphorus was burned in a high-velocity burner with 3 percent excess air and the calculated flame temperature was 4800° F. When the phosphorus contains hazardous organic compounds, higher flame temperatures may be needed for decomposition of these compounds. Air can be preheated up to the temperature limit for the materials of construction for the heater, and the phosphorus flame temperature can be increased to a value which is substantially greater than 4800° F.

EXAMPLE XV

Phosphate ores are mineral apatites which contain both phosphorus and fluorine. The basic mineral in phosphate ores is fluorapatite and it has the formula, $Ca_{10}(PO_4)_6F_2$. The theoretical $F/P_2O_5$ weight ratio is 0.089. Fluorapatite is modified in most phosphate ores whereby carbonate and fluorine are substituted for phosphate, and some calcium is replaced by other metals. The $F/P_2O_5$ weight ratio is generally higher than 0.089.

Phase changes occur when the ores are heated to high temperatures. Fluorapaptite crystallizes and some of the fluorine volatilizes. Before heating, the modified fluorapatite is present as crystallites. In high-temperature agglomeration processes, induration of the aggregates is attributed to interlocking of the crystals.

The onset of the phase changes is taken to be the temperature at which volatilization of fluorine begins. The modified fluorapatite compound loses fluorine and the $F/P_2O_5$ weight ratio approaches 0.089. However, $Ca_{10}(PO_4)_6F_2$ molecule can be decomposed by heat, fluorine will be volatilized, and the $F/P_2O_5$ weight ratio is reduced to values less than 0.089.

Experiments were carried out in the laboratory with Tennessee phosphate ore to determine the temperature at which fluorine begins to volatilize. Samples were heated to 500°, 600°, 700°, 800°, and 950° C. A small amount of fluorine was volatilized at 950° C. (1742° F.) but no fluorine was volatilized at lower temperatures. A temperature of about 1700° F. was taken to be the temperature at which phase changes occur.

Having thus described the invention, what is claimed is:

1. A process for the production of phosphoric acid comprised of the following steps:
   (a) agglomerating phosphate ore by tumbling with a binder formed by reacting acidic phosphorus compounds with alkaline substances;
   (b) smelting agglomerated phosphate ore in step (a) with reducing carbon and silica in a submerged-arc electric furnace;
   (c) cooling gases in step (b) by contacting said gases with water;
   (d) collecting mixtures of phosphorus, phosphorus sludge, and water from step (c) in a sump;
   (e) separating water from mixture of phosphorus and phosphorus sludge in sump of step (d);
   (f) recycling water from step (e) to step (c);
   (g) bleeding off a stream of water from step (f);
   (h) separating phosphorus from phosphorus sludge containing benzene insoluble materials in sump of step (d);
   (i) pumping the phosphorus sludge from step (h) to a feed tank;
   (j) feeding phosphorus sludge from step (i) to a burner;
   (k) oxidizing phosphorus sludge from step (j) to form a mixture of phosphorus oxides containing said benzene insoluble materials and comprising $P_4O$, $P_2O$, $P_2O_3$, $P_2O_4$, $P_2O_5$, and $P_2O_6$;
   (l) reacting phosphorus oxides in step (k) with water to form acidic phosphorus compounds containing said benzene insoluble materials;
   (m) pumping acidic phosphorus compounds in step (l) including said benzene insoluble materials to step (a);
   (n) pumping phosphorus in step (h) to a feed tank;
   (o) feeding phosphorus from step (n) to a burner;
   (p) oxidizing phosphorus in step (o) to form phosphorus pentoxide;
   (q) reacting phosphorus pentoxide in step (p) with water to form phosphoric acid solution; and
   (r) pumping phosphoric acid solution in step (q) to product storage.

2. The process of claim 1 wherein the binder in step (a) is formed by reacting acidic phosphorus compound with alkaline substances taken from the group, ground phosphate ore, calcium oxide, calcium hydroxide, calcium carbonate, anhydrous ammonia, ammonium hydroxide, ammonium carbonate, sodium oxide, sodium hydroxide, and sodium carbonate.

3. The process of claim 1 wherein the reducing carbon in step (b) is agglomerated by tumbling with a binder formed by reacting acidic phosphorus compounds with alkaline substances.

4. The process of claim 1 wherein the silica in step (b) is agglomerated by tumbling with a binder formed by reacting acidic phosphorus compounds with alkaline substances.

5. The process of claim 1 wherein the silica in step (b) is flotation tailings.

6. The process of claim 1 wherein the reducing carbon of step (b) is taken from the group, metallurgial coke, anthracite coal, semi-anthracite coal, low-volatile bituminous coal, medium-volatile bituminous coal, high-volatile bituminous coal, charcoal, char, petroleum coke, and forest products.

7. The process of claim 1 wherein the stream of water bled off in step (g) is added to first- and second-stage reactors in a process for the production of orthophosphate suspension fertilizer.

8. The process of claim 1 wherein ammonium phosphate is dissolved in the stream of water bled off in step (g) and said ammonium phosphate is taken from the group, monoammonium phosphate, diammonium phosphate, and ammonium polyphosphate.

9. The process of claim 1 wherein phosphorus and phosphorus sludge are pumped to a tank having a submerged pump in a well wherein phosphorus is separated from phosphorus sludge by pumping out the bottom layer through a sight glass.

10. The process of claim 1 wherein phosphorus is separated from the mixture of phosphorus and phosphorus sluge by centrifuging.

11. The process of claim 1 wherein the burner in step (j) is a high-velocity burner.

12. The process of claim 1 wherein phosphorus sludge in step (k) is oxidized by heated air.

13. The process of claim 1 wherein phosphorus pentoxide is formed in step (k).

14. The process of claim 1 wherein the water in step (l) is bleedoff water from step (g);

15. The process of claim 1 wherein the acidic phosphorus compound in step (l) is orthophosphoric acid.

16. The process of claim 1 wherein the acidic phosphorus compound in step (l) is comprised of a mixture of orthophosphoric acid and nonorthophosphoric acid.

17. The process of claim 1 wherein the phosphoric acid solution in step (r) comprises not less than about 99.98 percent phosphoric acid and a tripolyphosphoric acid content greater than 20 percent.

18. The process of claim 1 wherein the phosphoric acid solution in step (r) comprises not less than about 99.98 percent phosphoric acid, a tripolyphosphoric acid content greater than about 20 percent, a $F/P_2O_5$ weight ratio in the range of 0.000120 to 0.000140, and a total metals/$P_2O_5$ weight ratio in the range of 0.00060 to 0.00080.

* * * * *